April 12, 1938.  M. D. COULTER  2,113,782
METHOD AND APPARATUS FOR PRESERVING VEGETABLES
Filed Oct. 1, 1934
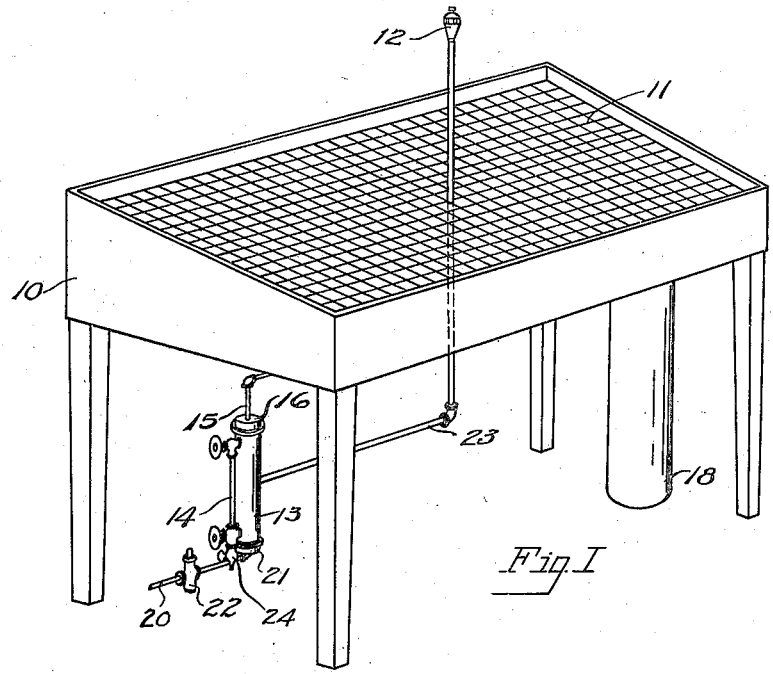
Fig. I
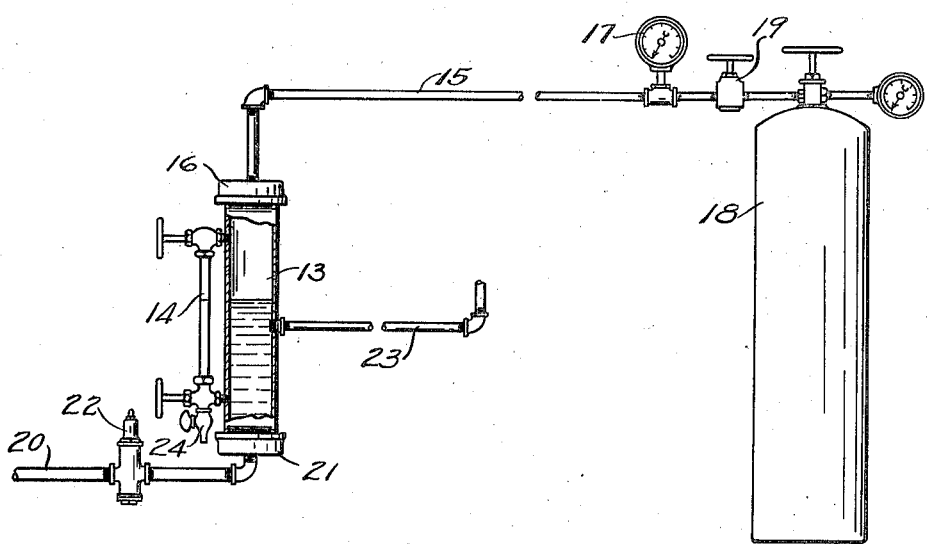
Fig. II
Marian D. Coulter
INVENTOR
BY Marshall
ATTORNEY Patented Apr. 12, 1938

2,113,782

UNITED STATES PATENT OFFICE 2,113,782

METHOD AND APPARATUS FOR PRESERVING VEGETABLES

Marion D. Coulter, Pittsburgh, Pa., assignor, by mesne assignments, to Produce Conditioners, Inc., a corporation of Ohio Application October 1, 1934, Serial No. 746,308

7 Claims. (Cl. 99—154)

Vegetables on display in shops are subject to rapid deterioration and the resulting spoilage loss is a large item of overhead expense as well as a regrettable waste.

The principal object of this invention is to provide a method and apparatus for preserving vegetables by treating them with a fine spray of water and carbon dioxide.

More specific objects and advantages are apparent from the description, in which reference is had to the accompanying drawing illustrating a preferred embodiment of the apparatus.

Figure I of the drawing is a perspective view of the apparatus.

Figure II is a front elevational view on a larger scale of a portion of the apparatus, shown partly in section.

But this specific drawing and the specific description that follows are to disclose and illustrate the invention, and are not to impose limitations on the claims.

The vegetables to be treated are arranged on any suitable support, such as a display stand 10. They are preferably held by a tray 11 that has meshes or slits so that the carbon dioxide-water mist may circulate down through the vegetables into a drain pan below. Although the mist containing carbon dioxide and water may be produced by releasing carbon dioxide gas and water spray from two adjacent heads, it is preferable to use but a single head and to combine the carbon dioxide and water in the form of a solution. For spraying the carbon dioxide solution, a spray head 12 is provided, which should be high enough above the tray to distribute the mist to all the vegetables. Additional heads located approximately 48 inches apart and 15 inches high may be used to accommodate a larger stock of vegetables. Of course this arrangement of the spray heads is only for the purpose of assuring distribution of the spray to all parts of the rack, so that the spray head or heads may be given any other suitable location when means is provided for distributing the spray to the vegetables other than the natural atmospheric currents.

The necessary solution is prepared most easily by bringing water and carbon dioxide together under pressure, preferably in a solution chamber 13 with a water level gauge 14 tapped into one side. From the solution chamber a pipe line 15 leads to the carbon dioxide supply. It is convenient to thread the pipe line into a cap 16 screwed on the top of the solution chamber. On the pipe line may be provided a pressure gauge 17 to indicate the pressure on the system. A source of carbon dioxide for the line such as a pressure cylinder 18 may be connected thereto by a needle reducing valve 19. Water is led from the available supply to the solution chamber through a water pipe 20 that is preferably threaded into a bottom cap 21 and provided with a water reducing valve 22 to supply water to the chamber at substantially constant pressure. The solution to be sprayed is drawn off through a solution line 23.

For supplying a single spray head a solution chamber 2 inches in diameter with ¼ inch pipe lines, and an operating pressure of about 55 pounds per square inch has been found adequate. The dimensions should be increased when numerous spray heads are to be supplied. Parts that come in contact with the solution or mist should be made or at least plated with one of the well known metals that resist corrosion by acids because of the slight acidity of the solution. In all cases the pressure on the system should be fixed below the minimum daily water pressure by adjustment of the reducing valve in the water line and the needle valve in the gas line.

The valves should be so regulated that the pressures of the entering gas and the entering water are balanced to maintain a constant liquid level in the gauge glass. The level may be adjusted downward until it is only slightly above the outlet to the spray head by letting a little water out through a cock 24 on the lower end of the water level gauge. At each spray head should be provided a valve for cutting off the flow of solution and an adjustment for varying the quantity of mist produced.

As the water in the mist evaporates, the air adjacent the spray head is humidified and cooled and hence flows downward through the layers of vegetables. The moisture prevents drying out of the vegetables, and together with the carbon dioxide provides a natural medium for plant life, in which vegetables actually gain in weight. They are kept more crisp and fresh for several days, particularly when of the pod or leaf variety, by the carbon dioxide-water mist than by any other known means. The explanation for their gain in weight is believed to be that the slight acidity of the atomized solution, which has a pH of about 6, facilitates both the absorption of water, and the assimilation of the carbon dioxide as food.

Changes in the form of the apparatus and the details of the process may be made to adapt the invention to various conditions.

Having described my invention, I claim:

1. The method of preserving fresh vegetables in open display racks that comprises bringing water and carbon dioxide together under pressure, and spraying the resulting solution continuously in a fine mist on the vegetables to be preserved.

2. The method of preserving vegetables in storage that comprises preparing a solution of carbon dioxide in water, spraying the solution in a fine mist, and causing the mist to circulate over the vegetables.

3. In an apparatus of the class described, in combination, a source of water under pressure, a source of carbon dioxide under pressure, a chamber connected to both sources containing a layer of gas above a layer of solution, means for regulating the depth of the layer of solution, means for withdrawing solution from the chamber from a point below the liquid level, and means for spraying the solution on vegetables in storage.

4. In an apparatus of the class described, in combination, a source of water under pressure, a source of carbon dioxide under pressure, a solution chamber connected to both sources, holding a body of liquid, means for drawing off solution from the chamber at a point below the liquid level, and means for spraying the solution adjacent vegetables to be preserved.

5. In an apparatus of the class described, in combination, a solution chamber, means for supplying water and carbon dioxide to the chamber, a spray head for treating vegetables connected to the chamber, and means for maintaining a solution level in the chamber a substantially constant distance above the outlet to the spray head.

6. In an apparatus of the class described, in combination, a support for holding vegetables to be preserved, a source of carbon dioxide, a source of water, and means for combining streams from the two sources in the form of a mist, said latter means being so associated with the vegetable support that the mist is circulated over the vegetables.

7. An apparatus for preserving vegetables in storage that comprises, in combination, a support for holding the vegetables, a source of aqueous carbon dioxide solution, and means for spraying the solution in a fine mist so associated with the vegetable support that the mist circulates over the vegetables.

MARION D. COULTER.